United States Patent Office 2,908,066
Patented Oct. 13, 1959

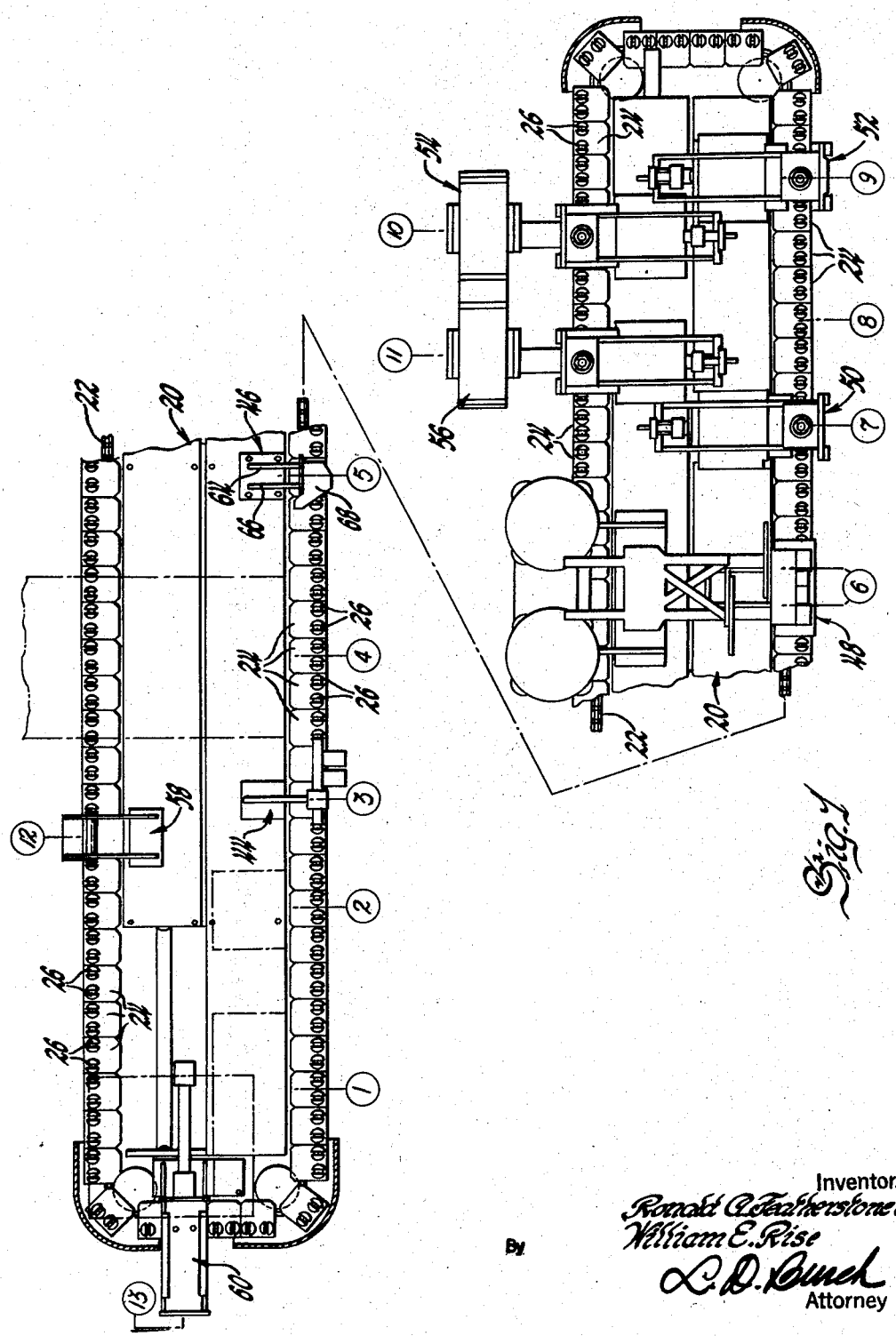

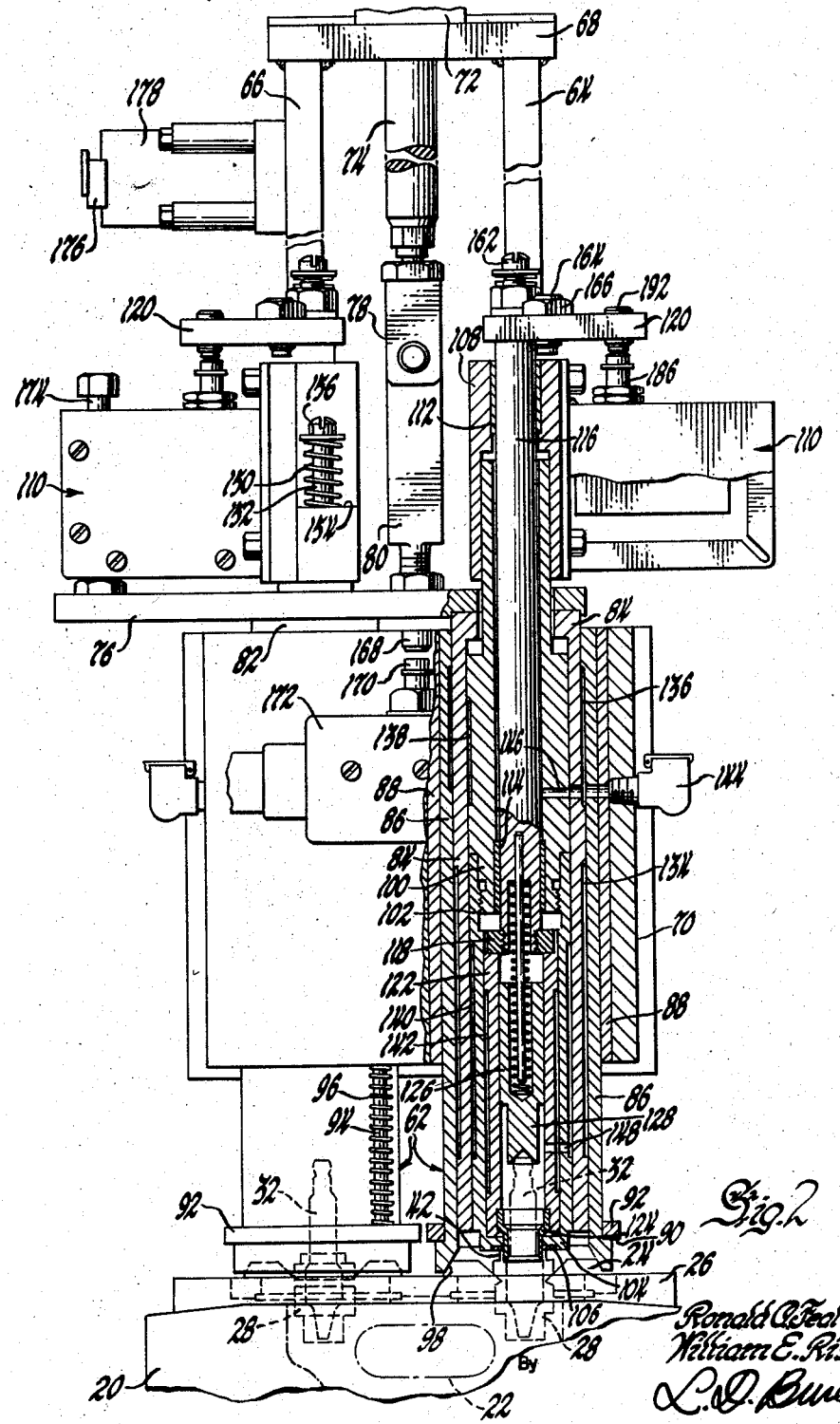

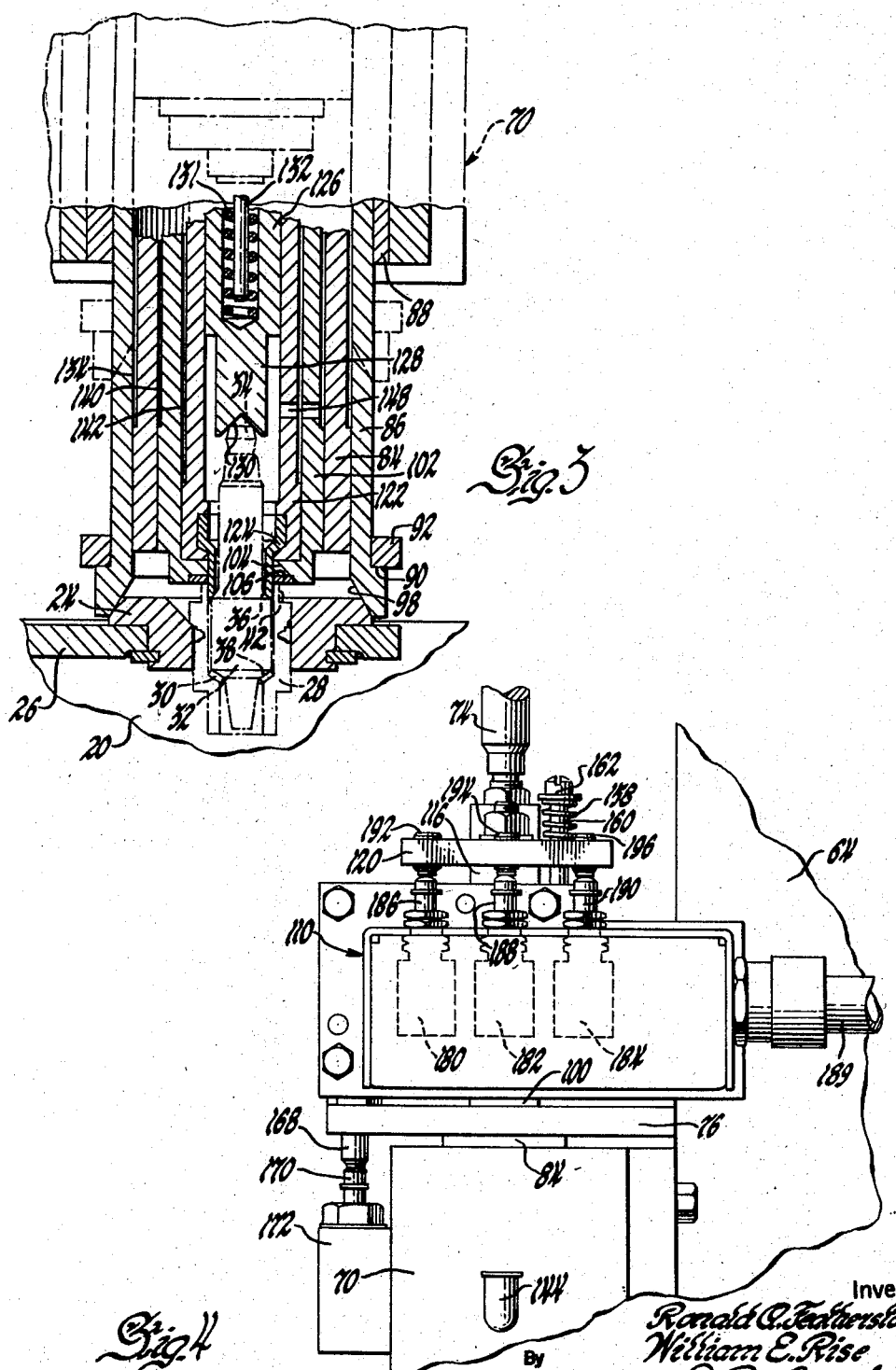

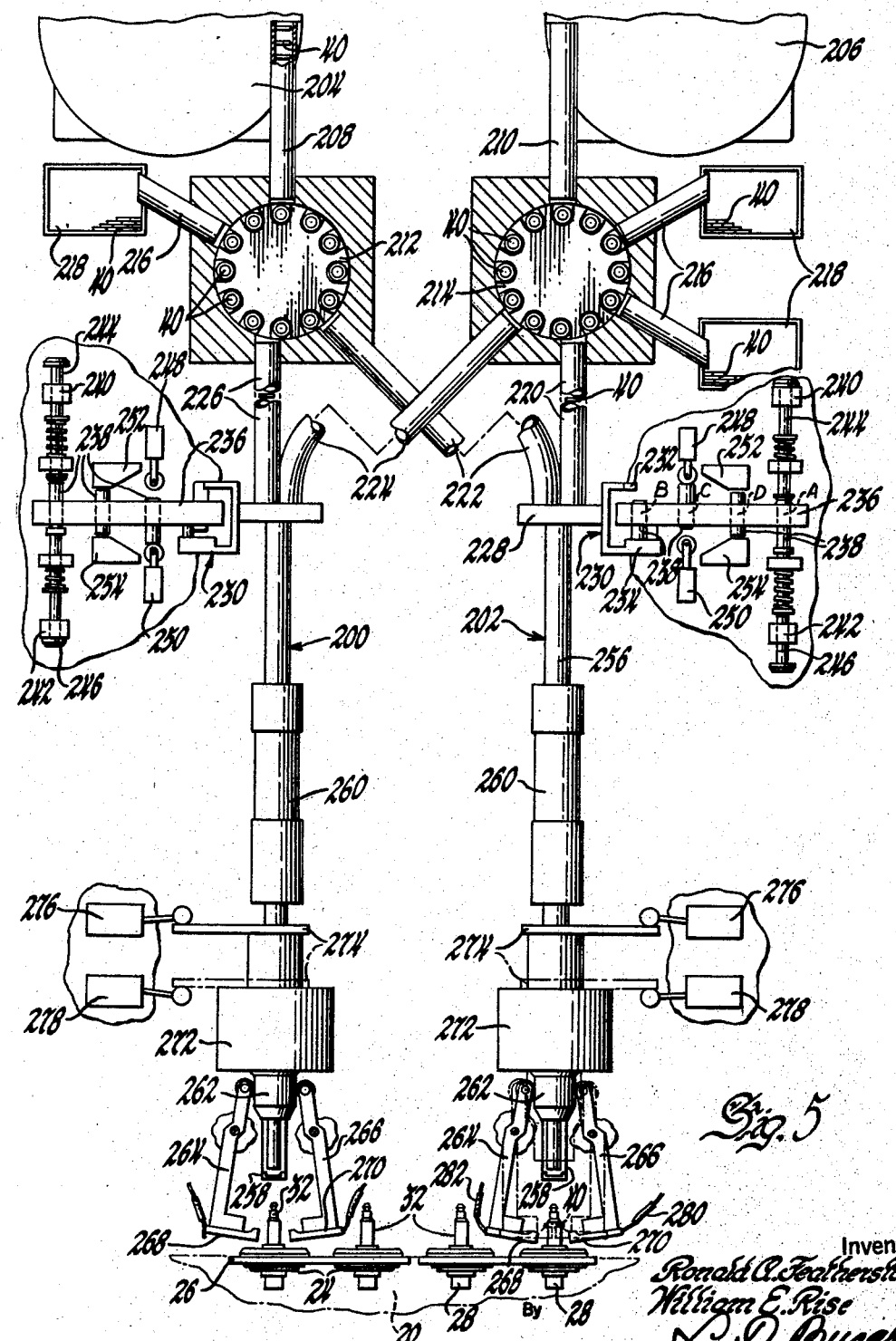

2,908,066

ASSEMBLY MACHINE

Ronald A. Featherstone, Highland Park, and William E. Rise, Detroit, Mich., assignors to General Motors Corporation, Detroit, Mich., a corporation of Delaware Application December 30, 1954, Serial No. 478,588

11 Claims. (Cl. 29—25.19)

This invention relates to assembly machines in general and more particularly to assembly machines including spaced and interrelated work stations.

Manually assembling parts to form a finished product is expensive in time, labor, and materials. Where possible automatic or semiautomatic assembly devices are used to replace manual labor. Such automatic machines include transfer means for progressively moving workpieces through a plurality of work stations in timed sequence and provide for simultaneous operation of different assembly and work devices on workpieces in different stages of completion so that a finished product will be obtained in the time required for the operation of the slowest work device.

Fully automatic machines have previously not been adaptable for all types of assembly work. Assembly machines require that all parts passing therethrough be within certain tolerances to facilitate uniform work conditions and identical end products. Those parts which do not conform to requirements or upon which imperfect work is performed are rejected at inspection stations. One instance in which these automatic assembly machines have not been overly adaptable is in the assembly of spark plugs. The insulator of a spark plug is a molded part which cannot be maintained within the close tolerance limits required of parts passing through an assembly machine without excessive cost in precision molding equipment. Variance in the height of shoulders formed on the spark plug insulator, for example, varies the material available from the outer spark plug shell to be crimped over the insulator after installation. This will result in either poor crimping if too little material is available or possibly damage to the insulator if too much material is available. Since automatic machines are principally adapted to deal with pre-established standards, the rejections in assembling spark plugs by previous assembling machines has proved too great to be practical.

It is now proposed to provide an assembly machine which is adaptable for use in assembling workpieces having some variable factor. It is proposed to provide an inspection or gauging station at which a partially assembled product may be inspected to determine its variance from prescribed standards. It is further proposed to relate the inspection station to another station wherein corrective measures may be automatically taken to assure a uniform assembled product. In the present instance this invention is related to spark plug assembly machines. Correction is made in the proposed machines by properly selecting a gasket member of a size which will compensate for the variance in size of another member; here the excess shell material. Other corrective measures such as weight, balance or other correction by adding or taking away material, may similarly be provided for in other machine installations.

Figure 1 is a diagrammatic layout of a spark plug assembly machine showing the workpiece travel and various work stations.

Figure 2 is a side elevational view of an inspection or gauging work station having parts broken away and shown in cross-section.

Figure 3 is an enlarged view of a part of the inspection or gauging work station having parts broken away and shown in cross-section to more clearly illustrate the structural elements thereof.

Figure 4 is an enlarged view of another part of the inspection or gauging work station.

Figure 5 is a diagrammatic representation of an assembly station including selective means for compensating for a variable factor.

The present invention is here shown as incorporated within a spark plug assembly machine which is adapted to assemble a spark plug insulator, including the central electrode, within an outer shell and between spaced washers or gaskets, and to crimp and weld the excess shell material over the gaskets to lock the insulator in place. The insulator is a molded piece including shoulders for spacing the gaskets. Because of the molding process and the tolerances on the shell and thickness of the bottom gasket, the distance between the shoulders may vary and consequently there may be more or less shell material to be crimped over the upper gasket than is desirable. Too much material may cause the insulator to be chipped or otherwise damaged, while too little material may result in a poor assembly.

The assembly machine includes a machine base 20 having several different work devices mounted thereon at spaced intervals and extended over a continuous loop conveyer line 22 provided about the base. The conveyer 22 includes a plurality of work carriage members 24 which each have a pair of work holders 26.

To more clearly illustrate the operation of the assembly machine in assembling spark plugs, the various work stations have been designated in Figure 1 by circled numerals 1 through 13. At station 1 a pair of spark plug outer shells 28 are placed within the work holder 24 of one of the carriage members 26. This may be done manually or automatically as by a hopper feed system. At station 2 a lower washer or gasket 30, reference Figure 3, is placed within each shell 28. At station 3 a device 44 is provided for checking the side electrodes of the shells 28 after which the insulator subassembly 32, including the central electrode 34, is inserted within each shell 28 at station 4. At station 5 a work device 46 measures the distance between the shoulders 36 and 38 of each insulator 32 to determine what size upper washer or gasket 40 will leave the proper amount of shell material, as at 42, to be crimped thereover. At station 6 a device 48 selects the proper size upper gasket 40 to be deposited over the electrode 34 and in the shell 28 in accordance with the determination made at the previous station. The interrelation of stations 5 and 6 will be covered in more detail later on. At station 7 the upper gasket 40 is pressed down to lock insulator on center in shell 28, at station 8 the insulator 32 is inspected for damage, and at station 9 the excess shell material 42 is crimped over the upper gasket 40 by a work device 52. Stations 10 and 11 include resistance heating devices 54 and 56, station 12 includes a device 58 for setting the electrode gap, and station 13 is where the assembled spark plugs are unloaded by a work device 60.

Referring now to Figure 2, the work device 46 of station 5 includes a pair of gauging or inspection devices 62 which are received over a pair of partially assembled spark plugs and are adapted to measure or determine the proper upper washer or gasket 40 which is to be inserted in the shells 28 thereof at the next station in order that there will be a proper amount of shell material 42 to be crimped and welded thereover.

The support structure of the work device 46 includes a pair of vertically disposed parallel spaced plates 64 and 66 secured to the machine base 20 in any acceptable manner and having a cross member 68 secured across the upper ends of the plates and extended forwardly over the conveyer line. A housing or sleeve guide member 70 is secured to the support plates 64 and 66 and is extended over the conveyer line in fixed spaced relation below the cross member 68. A fluid cylinder 72, only partially shown, is mounted vertically on top of the cross member 68 and includes a piston rod 74 extended downwardly and adapted to support a transverse plate 76 through extension link arms 78 and 80. A pair of depending sleeves 82 and 84 are secured to the transverse plate 76. These sleeves 82 and 84 each comprise part of separate inspection devices 62 and since the inspection devices are identical, only one such device will be described in detail.

The depending sleeve 84 is extended centrally through the stationary housing or sleeve guide member 70 in slidable relation within a work holder centering sleeve 86 which is itself slidably disposed within an insert sleeve 88 of the sleeve guide member 70. The centering sleeve 86 includes a shoulder 90 near its lower end upon which is retained a collar 92. Vertical guide rods 94 are secured to the collar 92 and include coil springs 96 thereon bearing against the sleeve guide 70 to bias the centering sleeve 86 downwardly. The centering sleeve 86 is conically undercut at its lower end 98 to receive and center one of the relatively movable work holders 24 of one of the carriage members 26.

Slidably journalled within the depending sleeve 84 is another sleeve member 100 having threaded to its lower end a shell engaging sleeve 102. The shell engaging sleeve 102 includes an inwardly extending flange 104 for engaging the upper edge of the spark plug shell 28 and having a ring 106 of tempered material set therein to prevent damage through repeated engagement with different spark plug shells. The upper end of the sleeve member 100 has secured thereto a sleeve 108 with a signal switch unit 110 fastened thereon. Within the sleeves 100 and 108, and slidably disposed within journal bearings 112 and 114 is an axially movable rod 116 having an abutment collar 118 secured to its lower end and a transversely extended plate 120 secured to the other end and disposed over the signal switch unit 110.

Slidably disposed within the sleeve 102, between the collar 118 of the rod 116 and the shell engaging flange 104 of sleeve 102, is a sleeve member 122 having an insulator shoulder engaging extension member 124 of hard and durable material secured to the lower end thereof and receivable centrally through the shell engaging flange 104. The relative disposition of the insulator shoulder 36 to the top of the spark plug shell 28 is transposed to the plate 120 and switch unit 110, respectively, through the rod 116, by abutment of sleeve 122 with collar 118, and through the sleeves 102, 100 and 108 which position the signal switch unit 110 relative to the plate 120.

To assure the vertical disposition of the insulator 32 within the shell 28, a centering member 126, including a depending stud 128 conically recessed at its lower end as at 130, is slidably disposed within sleeve 122 and is biased by a coil spring 131 received within the recessed upper end thereof and the recessed end of rod 116. The spring 131 is guided on pin 132 secured to rod 116 and biases the centering member 126 downwardly against the top of the insulator 32 which is received within the conical recess 130 thereof.

The sleeves 84, 86, 100, 102 and 122 are undercut as shown at 134, 136, 138, 140 and 142, respectively, and communicate with an oil cup 144 through lubricant passages 146 and 148 to assure adequate lubrication therebetween. The lubricant passage 148 is aligned with the grease cup 144 through undercut portion 140 of sleeve 102 when the relatively movable sleeves are retracted (such retracted position not being here shown).

The signal switch unit 110 and incident shell height gauging sleeves 108, 100 and 102 are biased downwardly by a spring member 150 disposed about a guide pin 152 secured to plate 76 and engaged between a shoulder 154 of the sleeve 108 and the head 156 of the guide pin. The rod 116 and plate 120, and consequently sleeve 122, are also biased downwardly by a spring member 158 disposed about a guide pin 160 secured to the signal switch unit 110 and engaged between the plate 120 and the head 162 of the guide pin.

A threaded bolt 164 and lock nut 166 secured to the plate 120 act as a limit stop to prevent excess relative travel between plate 120 and switch unit 110 which might otherwise damage the switch unit. Other stops include limit switches or signal devices such as stop 168 secured to plate 76 which engages actuator 170 of limit switch 172 to signal the lowering of the inspection devices to the proper position. Bolt 174 secured to plate 76 is adapted to engage actuator 176 of limit switch 178 secured to the support plate 66 to signal the retraction of the inspection devices. The retracted travel of the inspection devices is such as will clear the top of the spark plug insulator 32 as shown by the phantom view of the centering sleeve 86 and collar 92 in Figure 3.

The signal switch unit 110 includes three limit switches 180, 182 and 184 having their actuator buttons 186, 188 and 190, respectively, extended upwardly and are adapted to be respectively engaged by three limit stops 192, 194 and 196 secured within the plate 120 and aligned therewith. Variation in the relative distance between the top of the spark plug shell 28 and the shoulder 36 of the spark plug insulator 32 alters the relative disposition of plate 120 to switch unit 110. Consequently, all, two, one or none of the actuator buttons 186, 188 and 190 will be engaged depending upon whether, respectively, no available gasket is thin enough to be acceptable, the thinnest gasket is acceptable, the thicker gasket should be used, or none of the available gaskets are thick enough. Electrical leads (not here shown) from the switch devices 180, 182 and 184 are passed through conduit 189 of the switch unit 110 for connections as will hereafter be described.

The work device 48 at station 6 includes a pair of washer or gasket feed devices 200 and 202 shown diagrammatically by Figure 5. Gasket hoppers 204 and 206 contain upper insulator shoulder gaskets 40 of different predetermined thicknesses which are fed through conduits 208 and 210, respectively, to selectors 212 and 214. The selectors 212 and 214 rotate counterclockwise and clockwise, respectively, past reject conduits 216 sorting out bent and under or over size gaskets to reject containers 218 and directing proper size gaskets to pass conduits 220 and 222, and 224 and 226, respectively. A pass conduit from each hopper communicates with each gasket feed device 200 and 202. Since the gasket feed devices are principally the same only one will be described in detail.

The pass conduits 220 and 222 of different sized gaskets are stopped off by an escapement device 228 including an actuator 230 having forked arms 232 and 234 by which one or the other conduit, 220 or 222, is allowed to pass a gasket 40 depending upon which arm of the actuator is engaged. This may be by having one arm displaced radially from the other so that the escapement device moves further when one arm is engaged than when the other is engaged.

A memory disc 236, including several axially displaceable pins 238 spaced circumferentially about the edge thereof, is rotatable between the fork arms 232 and 234 of the actuator in timed relation to the indexing steps of the carriage members 26. Solenoids 240 and 242 controlling biased plungers 244 and 246, respectively, which are aligned on opposite sides of the memory disc 236 with the pin positions A, are adapted through the plungers to raise or depress a pin 238. After displacement of the pin 238 the memory disc is rotated through progressive steps until the pin engages one or the other of the escapement actuator arms 232 or 234 at position B to release a gasket. The memory disc 236 indexes the pin 238 next to position C to engage one or the other or neither of a pair of micro switches 248 and 250 spaced on opposite sides of the disc. The switches 248 and 250 may be connected to indicators or pilot lights (not here shown) which indicate the size gasket released or that none was released, in which case the partially assembled spark plug should be ejected, or these switches may be connected to an automatic ejector or pass device (also not shown). The pin 238 next enters centralizing cams 252 and 254, at position D, which alter the original pin setting by recentering the pin.

Beneath the escapement device 230 is the gasket feed conduit 256 through which the selected gasket 40 is dropped to the gasket jaws 258 disposed over one of the partially assembled spark plugs in the carriage member 26. A fluid cylinder 260 is disposed within the conduit 256 for moving the gasket jaw chuck 262 containing the gasket jaws downwardly over the spark plug insulator 32.

Downward movement of the gasket jaw chuck 262 is adapted to actuate insulator centering jaws 264 and 266 which are pivotally mounted and include inwardly extending lips 268 and 270, respectively, for engaging and centering the insulator. The centering jaws 268 and 270 are shown 90° out of position for purposes of illustration. However, they are normally positioned transversely of the movement of conveyer line 22.

An outwardly extended flange 274 included with the axially movable gasket jaw chuck 262 and collar 272 is adapted to engage one or the other of a pair of limit switches 276 and 278 to indicate the raised or lowered disposition of the gasket jaw chuck 262 and the engaged or disengaged disposition of the centralizing jaws 264 and 266.

The gasket feed devices 200 and 202 will be noted to be here associated with different work holders 24 of different carriage members 26. The one feed device 202 is an additional index step away from the other feed device 200. This requires that the memory disc 236 of the one device include an additional indexing step as compared to the other memory disc of the other feed device.

The work devices 46 and 48 of stations 5 and 6 are interrelated by connecting the limit switches 180, 182 and 184 of the signal units 110 to the solenoids 240 and 242 controlling the plunger pins 244 and 246. These connections are not shown but are such as will be understood and may be readily made by those experienced in this field. For example, one limit switch 180 would be connected to one solenoid 240 and the same limit switch 180 and another 182 would be connected to the opposite solenoid 242. If the limit switch 180 is actuated the solenoid 240, through the plunger 244, would move the actuator pin 238 in one direction, if limit switches 180 and 182 are actuated the other solenoid 242, through its plunger 246, would move the pin 238 in the opposite direction, but if none or all of the limit switches are actuated the solenoids 240 and 242 are inactive or equalized and the actuator pin 238 remains centered.

The spark plug assembly machine operates basically in the manner originally described; that is in moving the carriage members 26 with their workpieces progressively step by step through the various work stations. At the completion of an individual indexing movement a control switch (not here shown) is actuated which energizes or activates the fluid cylinder 72 to cause the piston rod 74 to move downwardly carrying with it the transverse plate 76, switch unit 110 and sleeve elements 82 and 84.

The work holder centering sleeve 86 first engages the work holder 24. The insulator shoulder engaging extension member 124 then contacts the insulator 32. The extension member 124 and its sleeve 122 continue downwardly while the insulator centering stud 128 engages and centers the insulator and until the shell engaging flange 104 of the sleeve 102 contacts the spark plug shell member 28. At this instance the limit switch 172 is actuated by the stop 168 on plate 76 energizing the limit switches 180, 182 and 184 of the signal unit 110 which then register or signal the distance between the insulator shoulder 36 and the top of the spark plug shell 28 thereby determining whether or not an upper gasket 40 is to be fed to that particular spark plug assembly and if so the size of such gasket. As mentioned previously, if the one switch 180 is actuated a gasket of one size is indicated, if the two switches 180 and 182 are actuated a gasket of another size is indicated and if none or all of the switches are actuated the partially assembled spark plug is to be rejected.

The de-energization of the fluid cylinder 72 is delayed by time delay or other means (not here shown) until the settings of limit switches 180, 182 and 184 have been transposed to the solenoid valves 240 and 242 after which the cylinder is de-energized retracting the transverse plate 76 and incident sleeve members 82 and 84. On the return stroke the limit switch 178 is actuated by the bolt 174 coming in contact with the switch actuator arm 176. The limit switch 178 causes the machine to index, moving another carriage member 26 under the inspection work device 46 and repeating the cycle upon the workpieces disposed within the work holders of such carriage member.

With each indexing of a carriage member 26 to the next position, the memory disc 236 is adapted to likewise index. The simultaneous indexing of carriage members and memory discs is not here shown but may be controlled in any of a number of ways such as by causing the conveyor line 22 to actuate a sprocket wheel which through related mechanical or electrical linkage will similarly index the memory disc. The indexing of the memory disc 236 is timed so that one of the actuator pins 238 on the memory disc is simultaneously operated with the work device 46 to register or record for a particular spark plug assembly the determination made by such work device and is positioned to engage one or the other, or neither of the fork arms 232 and 234 of the escapement device 228 subsequently and when that same spark plug assembly is disposed beneath the gasket feed device 202 with which that particular memory disc is associated.

As the carriage member 26 completes its indexing below one of the gasket feed devices 200 or 202 a control switch is actuated which energizes the fluid cylinder 260 to start the downward movement of the gasket jaw chuck 262. As the chuck 262 moves down the centralizing jaws 264 and 266 are pivoted and cammed to move the insulator engaging flanges 268 and 270 inwardly centering the insulator 32.

At the same time the indexing of the carriage member 26 to below the feed device 202 has caused the memory disc 236 to index the actuator pin 238 to engage one of the fork arms 232 or 234 of the escapement device 228 and to cause the selection of a gasket member 40. The gasket 40 falls through the feed conduit 256 to the gasket jaws 258. The gasket jaws 258 are opened in the course of the downward movement of the chuck 262 allowing the selected gasket to fall onto the centralizing jaws 264 and 266 engaged about the insulator 32. Electrical leads 280 and 282 are connected to each of the centralizing jaws 270 and 268, respectively, and when the gasket member 40 is dropped thereupon the circuit between the jaws is complete indicating that a gasket is present. At the same time the extended flange 274 of the chuck collar 272 engages the limit switch 278.

The completion of the circuit across the jaws 264 and 266 alone allows the machine to continue indexing. The actuation of the limit switch 278 de-energizes the fluid cylinder 260, causing the gasket jaw chuck 262 to be retracted, the centralizing arms 264 and 266 to be opened and dropping the gasket member 40 into position about the insulator 32 and within the spark plug shell 28.

At the end of the return stroke of the gasket jaw chuck 262, the extended flange 274 engages the limit switch 276 signaling the completion of the feed operation and allowing the machine to index to the next position and the cycle to be repeated.

If the operation of work device 46 of station 5 has indicated that no gasket is acceptable for use with the particular spark plug assembly then; this will prevent the indexing of the machine and will require that the operator cause that particular assembly to be rejected. The actuator pin 238 of the memory disc will remain centered and will not engage either of the fork arms 232 and 234 of the escapement device 228 or actuate either of the limit switches 248 and 250. Consequently, no gasket will be released at station 6 and the circuit across the centralizing jaws 264 and 266 will be broken, however, neither of the limit switches 248 and 250 will be actuated and consequently will allow the machine to continue indexing. This in effect allows carriers which are empty either through rejection and removal at station 5 or by operator failure to load carrier, to continue indexing through station 6 without the machine stopping.

We claim:

1. In combination in a machine for assembling workpieces wherein a workpiece member having a certain variable feature is inspected to determine which of several possible complementary workpiece members is to be assembled therewith to provide a uniform assembled workpiece combination, a first device for receiving a plurality of workpiece members and including means for inspecting said members individually to determine the extent of variation thereof, means having operable connections to said first device and operated simultaneously therewith through said connections for recording the determination made by said first device as to one of said workpiece members, a source of possible complementary workpiece members, a second device for selecting from said source one of said possible complementary workpiece members in accordance with the determination made by said first device and recorded by said recording means, said recording means being interconnected with and timed to subsequently actuate said second device in accordance with the determination made by said first device when said one workpiece member is received thereby, and said first device being operable upon subsequent workpiece members independently of the time of operation of said second device with respect to said one workpiece member.

2. In a machine for assembling complementary workpiece parts, a first work device for receiving a plurality of similar workpiece parts and for inspecting one of said workpiece parts to determine the complementary workpiece part acceptable for assembly therewith, a source of possible complementary workpiece parts, a second work device for selecting from said source one of said possible complementary workpiece parts in accordance with the determination of said first work device, and means operable simultaneously with the operation of said first work device on any of the other similar workpiece parts and subsequently upon said second work device to actuate said second work device when said one workpiece part is received thereby, said means having interrelated controls and connections operated by and connected with said devices.

3. In a machine for assembling complementary workpiece parts, a first device for receiving and inspecting one of said workpiece parts, a source of other workpiece parts one of which is complementary to said one workpiece part, said first device including means for determining which one of said other workpiece parts is complementary to said one workpiece part, a second device for selecting from said source said one other workpiece part and for assembling said one other workpiece part with said one workpiece part, and a third device interconnected with said first and second devices for recording the determination made by said destermining means simultaneously with the operation of said first device and including means for subsequently actuating said second device in accordance with the determination made by said determining means when said one workpiece is received by said second device.

4. In a machine for assembling complementary workpiece parts, a first device for receiving and individually inspecting a plurality of workpiece parts, a source of other workpiece parts, said first device including means for determining which of said other workpiece parts is complementary respectively to each one of said workpiece parts, a second device for selecting from said source the one of said other workpiece parts which is complementary respectively to each one of said workpiece parts, conveyer means for moving each of said workpiece parts from said first device to said second device, and a third device connected to said determining means including means for recording the successive determinations made by said determining means, said recording means being timed with said conveyer means and connected with said second device for subsequently actuating said second device in accordance with the determination made by said determining means upon one of said workpieces when said one workpiece is received by said second device.

5. In a machine for assembling complementary workpiece parts, a first device for receiving and inspecting a workpiece part, a source of different workpiece parts one of which is complementary to said workpiece part, said first device including means for determining which one of said different workpiece parts is complementary to said workpiece part, a second device including means for selecting from said source said one different workpiece part in accordance with the determination made by said determining means and for assembling said workpiece parts together, and a third device interconnected with said first and second devices for recording the determinations made by said determining means and connected thereto for simultaneous operation therewith on any other workpiece part and including means for subsequently actuating said selecting means when said workpiece is received by said second device.

6. In a machine for assembling complementary workpiece parts, a first work device for receiving a plurality of similar workpiece parts and including means for inspecting one of said workpiece parts and for determining the possible complementary workpiece part acceptable for assembly therewith, a source of possible complementary workpiece parts, a second work device for selecting from said source one of said possible complementary workpiece parts in accordance with the determination made by said first work device, conveyer means for transferring said one workpiece part and all subsequent workpiece parts between said work devices, and a device interconnected with said first and second work devices and connected to said determining means for operation simultaneously therewith and including means for subsequently actuating said second work device, said last named means being connected and timed with said conveyer means for actuating said second work device when said one workpiece is received by said second work device and simultaneously with the operation of said first work device upon any of said subsequent workpiece parts.

7. In a machine for assembling complementary workpiece parts, a first device for receiving and individually inspecting a plurality of workpiece parts, a source of different workpiece parts one of which is complementary to one of said workpiece parts, said first device including means for determining the one of said different workpiece parts which is complemenary to said one workpiece part, a second device including means for selecting from said source said one different workpiece part and for assembling said one different workpiece part with said one workpiece part, conveyer means interconnecting said first and second devices and transferring said one workpiece part and subsequent workpiece parts from said first device to said second device, and a third device connected to said determining means for simultaneous operation therewith for recording the determinations made by said determining means with respect to each of said subsequent workpieces, said recording means being interconnected and timed with said conveyer means for subsequently actuating said selecting means in accordance with the determination made by said determining means with respect to said one workpiece part when said one workpiece part is received by said second device.

8. In a machine for assembling workpiece parts, a first device for receiving and individually inspecting a plurality of workpiece parts, a source of different workpiece parts one of which is complementary to one of said workpiece parts, said first device including means for determining the one of said different workpiece parts which is complementary to said one workpiece part, a second device connected with said first device and including means for selecting from said source said one different workpiece part and for assembling said one and said one different workpiece part together, and a third device having connections with said first and second devices and connected to said determining means for recording the determinations made thereby and being operated simultaneously with the operation of said determining means on different workpieces to record determinations of said determining means independently of the operation of said second device, said recording device subsequently actuating said selecting means through said connections in accordance with the determination made by said determining means with respect to said one workpiece part when said one workpiece part is received by said second device.

9. A device for centering elements which are disposed one within the other and for determining the relative disposition of said elements with respect to each other when so centered, said device including a plurality of coaxially disposed sleeve members, said sleeve members including first and second pairs of sleeve members having one sleeve member of each pair engaging one of said elements, said first pair of sleeve members centering said elements with respect to each other, said second pair of sleeve members having means interconnected therewith for determining the relative disposition of said elements with respect to each other by the relative disposition of the sleeve members of said second pair.

10. A device for centering elements which are disposed one within the other and for determining the relative disposition of said elements with respect to each other when so centered, said device including a plurality of coaxially disposed sleeve members, said sleeve members including first and second pairs of sleeve members having one sleeve member of each pair engaging one of said elements, said first pair of sleeve members centering said elements with respect to each other, said second pair of sleeve members having means interconnected therewith for determining the relative disposition of said elements with respect to each other by the relative disposition of the sleeve members of said second pair, and means connected to said second pair of sleeve members and responsive to said determining means for selecting a third element in accordance with the determination of the relative disposition of said second pair of sleeve members for assembly with said other elements.

11. A device for determining the relative disposition of one member to another and for selecting an element acceptable for assembly with said members, said device including a pair of coaxially disposed sleeves, one of said sleeves engaging said one member and the other of said sleeves engaging said other member, means connected with and responsive to the relative disposition of said sleeves for determining the relative disposition of said members, and means operably connected to said sleeves through said determining means for selecting an element in accordance with the determination made by said determining means which may be assembled with said members.

References Cited in the file of this patent

UNITED STATES PATENTS

| | | |
|---|---|---|
| 2,106,451 | Brown | Jan. 25, 1938 |
| 2,243,379 | Johnson | May 27, 1941 |
| 2,563,468 | Hroch | Aug. 7, 1951 |
| 2,694,960 | Kahle et al. | Nov. 23, 1954 |